United States Patent [19]
Bannai et al.

[11] Patent Number: 5,044,968
[45] Date of Patent: Sep. 3, 1991

[54] CLOCK SPRING

[75] Inventors: Hiroyuki Bannai, Furukawa; Hironori Kato, Sendai, both of Japan

[73] Assignee: Alps Electric Co., Ltd., Tokyo, Japan

[21] Appl. No.: 633,916

[22] Filed: Dec. 26, 1990

[30] Foreign Application Priority Data

Dec. 26, 1989 [JP] Japan .............................. 1-148719[U]

[51] Int. Cl.$^5$ ............................................ H01R 35/00
[52] U.S. Cl. ....................................... 439/164; 439/15
[58] Field of Search ....................... 439/4, 13, 15, 164; 74/484 R

[56] References Cited

U.S. PATENT DOCUMENTS

| | | | |
|---|---|---|---|
| 4,721,469 | 1/1988 | Carlson | 439/13 |
| 4,966,554 | 10/1990 | Tsukamoto | 439/164 X |
| 4,978,191 | 12/1990 | Hasegawa et al. | 439/164 X |

FOREIGN PATENT DOCUMENTS 2747126  4/1979  Fed. Rep. of Germany ........ 439/13

Primary Examiner—Eugene F. Desmond
Attorney, Agent, or Firm—Guy W. Shoup; David W. Heid

[57] ABSTRACT

A clock spring is used in a steering system for automobile cars and comprises a stationary member and a movable member provided rotatably relative to the stationary member, both of which are electrically connected by using cables. The cables are received in the receiving portions formed by the stationary member and the movable member, and a spacer having openings is rotatably provided between the stationary member and the movable member. The cables are wound in one of the cable receiving portions, the remaining portions of the cables being respectively passed through the openings and wound in the other receiving portion in the reverse direction. Rollers each having a diameter greater then the thickness of the spacer are rotatably eccentrically provided in the openings so that the cables are respectively wound on the rollers to form a half loop.

2 Claims, 6 Drawing Sheets

CLOCK SPRING

BACKGROUND OF THE INVENTION

The present invention relates to a clock spring used in automobile steering systems or the like which comprises a stationary member and a movable member which are electrically connected to each other by using cables.

Clock springs are generally used as electrical connectors, for example, in automobile steering systems or the like and comprise a stationary member and a movable member rotatably mounted relative to the stationary member, these members being electrically connected to each other by using flexible cables.

A known example of such a clock spring comprises a cable receiving portion provided between a stationary member and a movable member, and a flat cable which is formed by laminating a plurality of conductor strips between two band films and which is wound into a coil and gently received in the cable receiving portion, one end of the flat cable being fixed to an outer ring wall formed in either the stationary member or the movable member, the other end being fixed to an inner ring wall formed in the other member.

This clock spring permits the flat cable received in the cable receiving portion to be wound on the inner ring wall and rewound on the outer ring wall in correspondence with the rotational direction of the movable member. Thus, substantially no tension acts on the flat cables between a state where the flat cable is completely wound on the inner ring wall and a state where the flat cable is completely rewound on the outer ring wall. It is therefore possible to constantly maintain the electrical connection between the stationary member and the movable member both of which rotate relative to each other.

In the above-described clock spring, since the flat cable is wound and rewound by employing a difference between the diameter of the outer ring wall and that of the inner ring wall, when the rotational amount of the movable member is constant, the length of the flat cable, that can be used, can be reduced by increasing the difference between these two diameters. However, the diameter of the inner ring wall is generally determined by the diameter of a rotational shaft, for example, a steering shaft of an automobile car, in which the clock spring is installed. On the other hand, since the diameter of the outer ring wall can be only slightly increased because there is a demand for reduction in the size of the clock spring, the difference between the diameter of the outer ring wall and that of the inner ring wall can also be only slightly increased. Such a clock spring therefore has a problem in that it generally requires a long flat cable, and, as is already known, the use of a long flat cable causes difficulties as regards the production of the clock spring and thus causes an increase in the total cost thereof.

SUMMARY OF THE INVENTION

The present invention has been achieved in consideration of the above situation of prior art, and it is an object of the present invention to provide an inexpensive clock spring suitable for reducing the size of a steering shaft of an automobile or the like.

In order to achieve the object, the present invention provides a clock spring comprising a stationary member, a movable member rotatably mounted relative to the stationary body and cables received in cable receiving portions defined by the stationary member and the movable member, respective ends of the cables being fixed in the stationary member and let out to the outside thereof, the other ends being fixed in the movable member and let out to the outside thereof, wherein a spacer having openings is rotatably interposed between the stationary member and the movable member, rollers each having a diameter greater than the thickness of the spacer are respectively, eccentrically and rotatably supported in the openings, the cables are wound in one of the cable receiving portions which are separated from each other by the spacer, with the remaining portions of the cables being respectively folded by the rollers and wound in the opposite direction within the other cable receiving portion.

When the movable member is rotated in either the normal direction or the reverse direction with respect to the stationary member, the cables having a length, which is half the rotational amount of the movable member, are respectively let out of the one of the cable receiving portions, folded by the rollers to form half loops and wound in the other cable receiving portion. In this case, since each of the rollers has an eccentric rotational shaft, the rollers rotate corresponding to the winding states of the cables so as to variably project from the both sides of the spacer.

BRIEF DESCRIPTION OF THE DRAWINGS

FIGS. 1 to 7 relates to a first embodiment of the present invention in which:

FIG. 1 is an exploded perspective view of the whole of a clock spring;

FIG. 2 is a partially broken-out plan view of the clock spring shown in FIG. 1;

FIG. 3 is a longitudinal sectional view of the clock spring shown in FIG. 1;

FIG. 4 is a bottom view of an upper case;

FIG. 5 is an exploded perspective view of a spacer and rollers; and

FIGS. 6 and 7 are explanatory views of the operation of flexible cables; and

FIGS. 8 to 11 relates to a second embodiment of the present invention in which:

FIG. 8 is a longitudinal sectional view of a clock spring;

FIG. 9 is an explanatory view of the winding state of flexible cables;

FIG. 10 is an exploded perspective view of a spacer and rollers; and

FIG. 11 is an explanatory view of the operation of flexible cables.

DETAILED DESCRIPTION OF PREFERRED EMBODIMENTS

Embodiments of the present invention will be described below with reference to the drawings.

Figure 1:
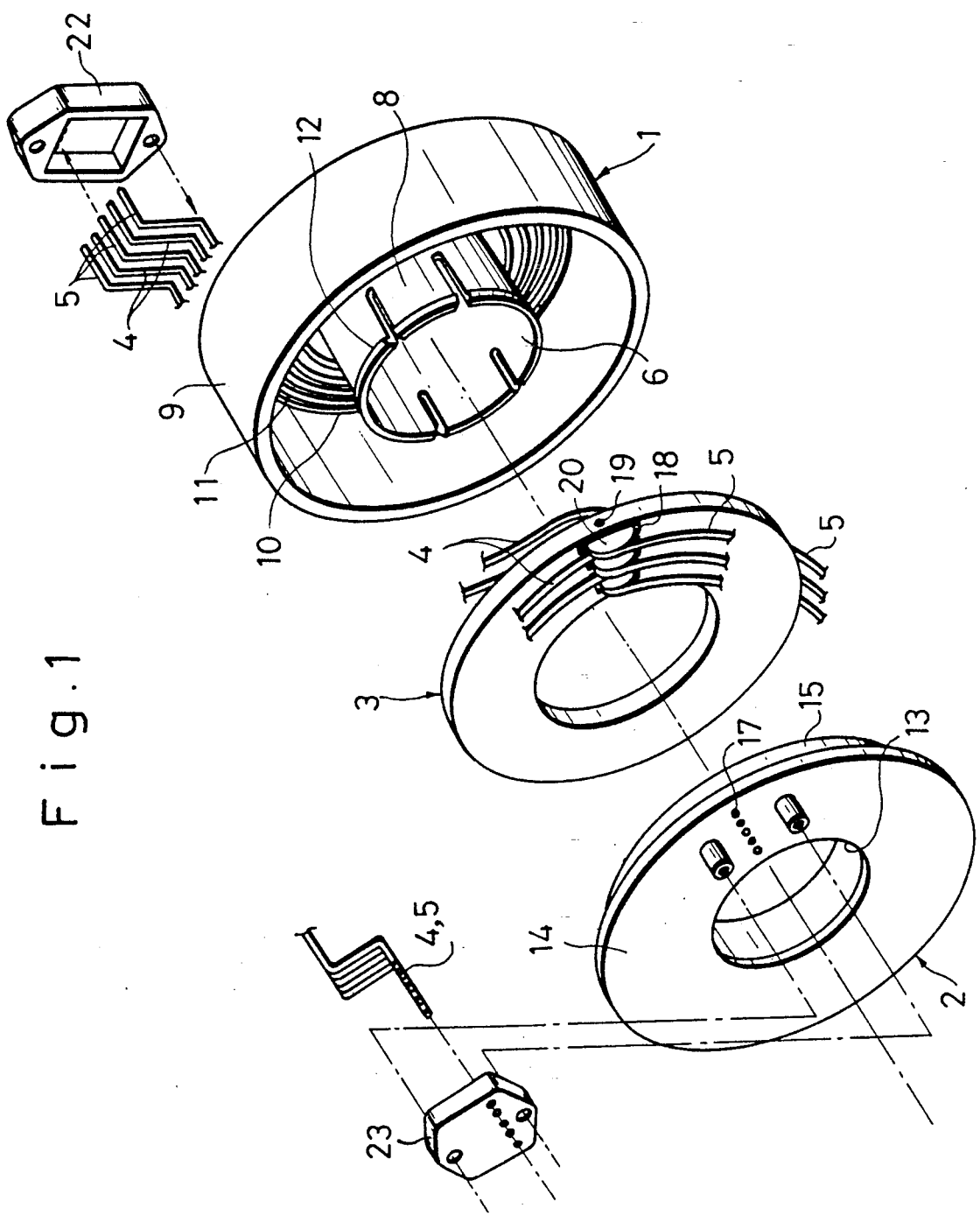
Figure 2:
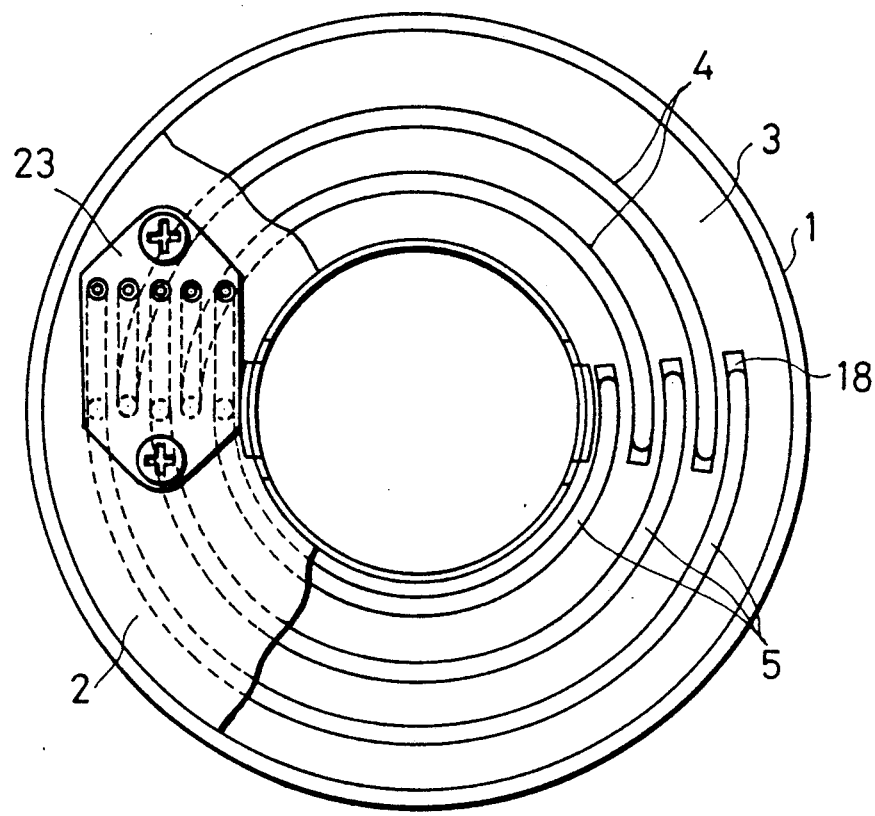
Figure 3:
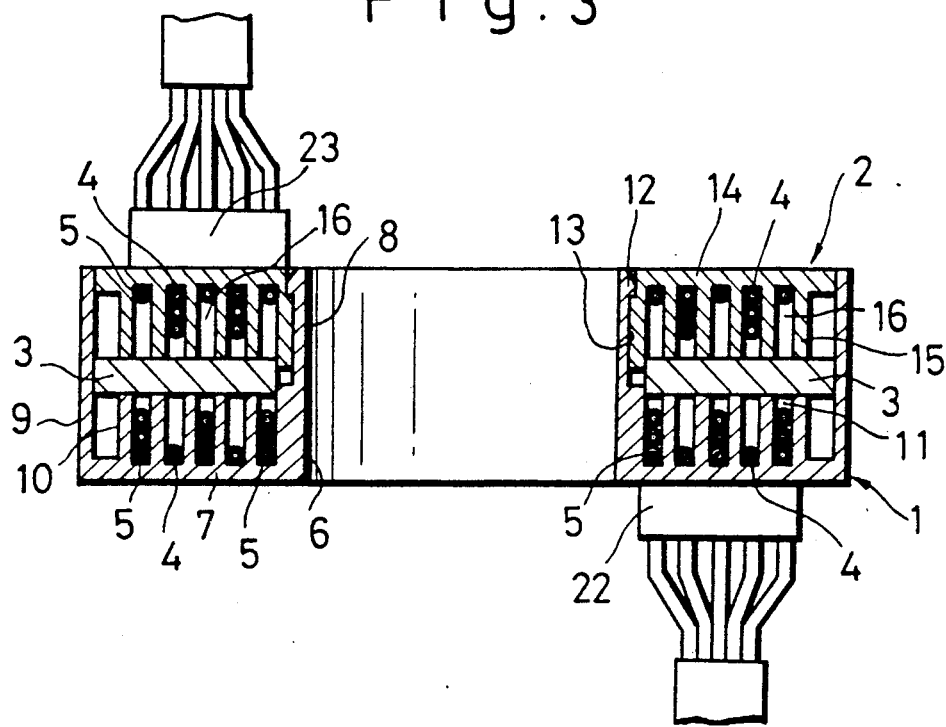
Figure 4:
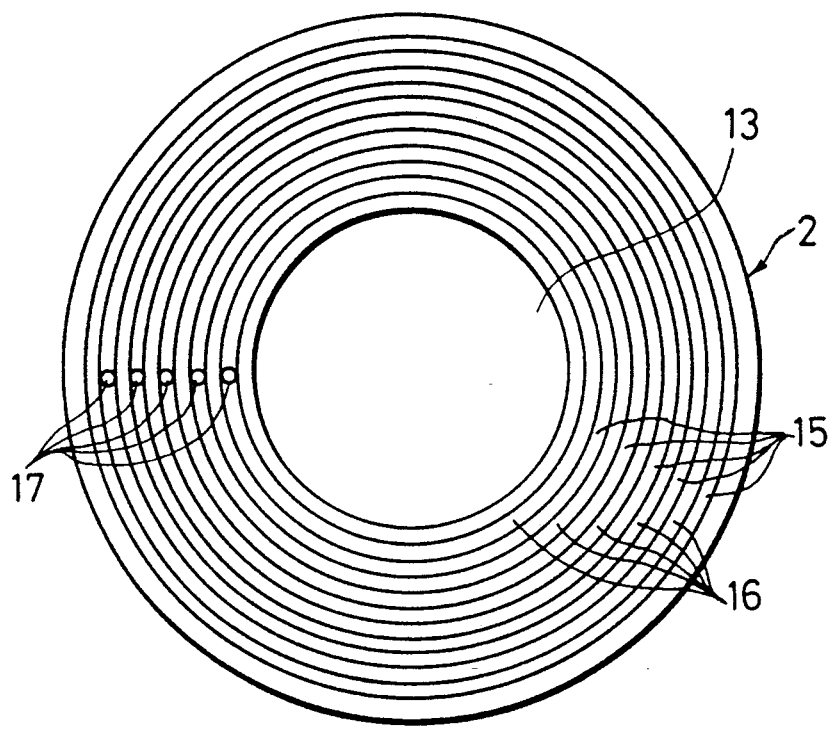
Figure 5:
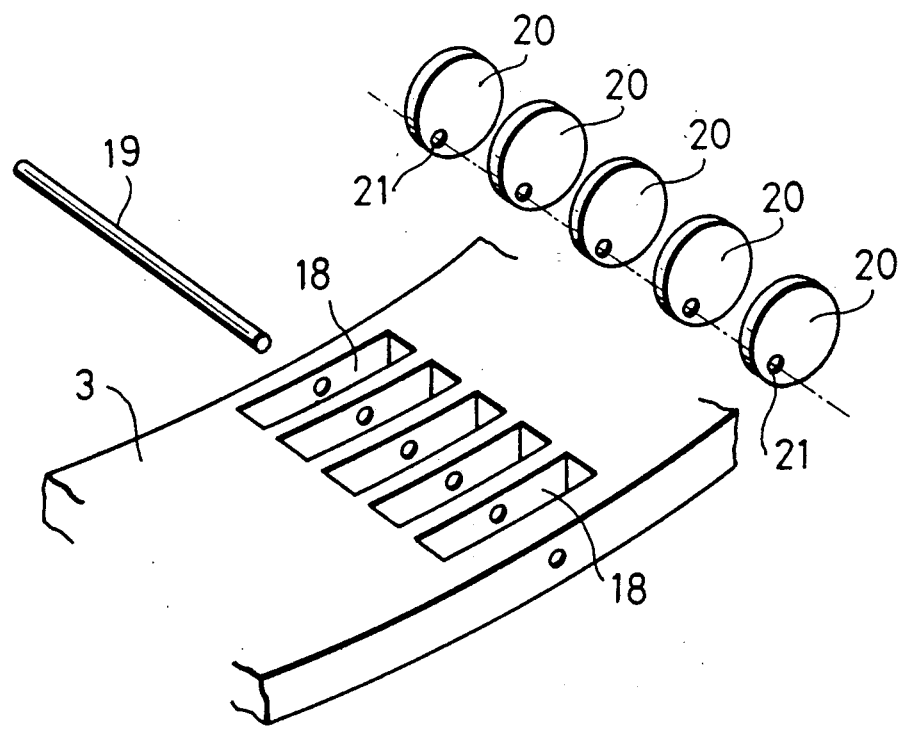
Figure 6:
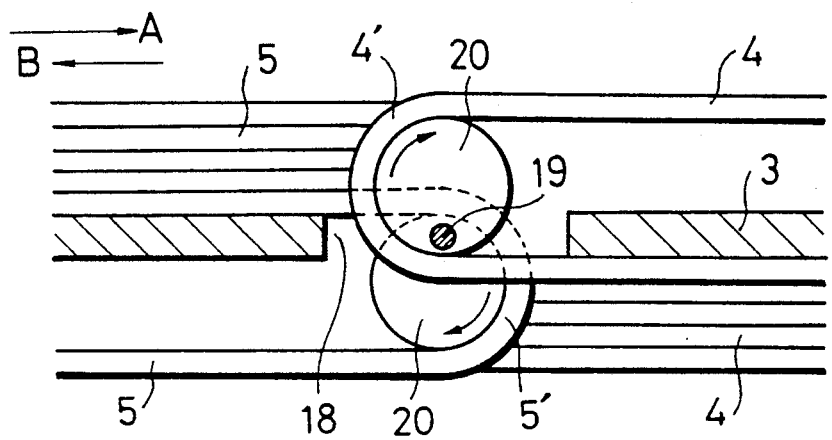
Figure 7:
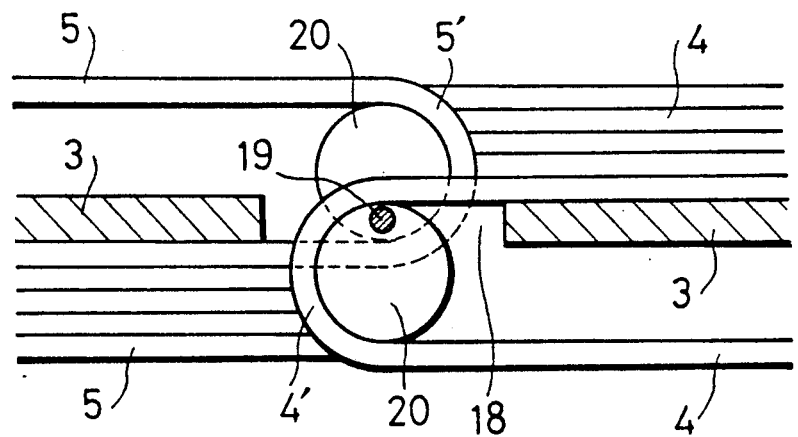

FIGS. 1 to 7 relates to a first embodiment of the present invention. FIG. 1 is an exploded perspective view of a clock spring, FIG. 2 is a plan view of the same, FIG. 3 is a longitudinal sectional view of the same, FIG. 4 is a bottom view of an upper case, FIG. 5 is an exploded perspective view of a spacer and rollers, and FIGS. 6 and 7 are explanatory view of the operation of flexible cables.

As shown in FIGS. 1 to 3, a clock spring generally comprises a lower case 1, an upper case 2 rotatably held relative to the lower case 2, a spacer 3 rotatably held between the cases 1 and 2 and flexible cables 4, 5 wound between both cases 1, 2.

The case 1 has a bottom plate 7 in which a central hole 6 is opened at the center thereof, and an inner peripheral wall 8 and an outer peripheral wall 9 which are respectively erectly provided in the inner and outer peripheries of the bottom plate 7. The whole of the case 1 is formed into a bottomed cylindrical shape. The bottom plate 7 has a plurality of projection strips 10 which are erectly concentrically provided around the central hole 6 formed at the center thereof. The adjacent projection strips 10 form a plurality (5 in this embodiment) of concentric first cable receiving grooves 11. A cable lead through hole (not shown) is formed at the bottom of each of the first cable receiving grooves 11. A flange 12 is formed at the upper edge of the inner peripheral wall 8.

As shown in FIG. 4, the upper case 2 has a top board 14 in which a central hole 13 is formed at the center thereof so that the upper case 2 is rotatably connected to the lower case 1 by snap coupling it to the inside of the flange 12 of the inner peripheral wall 8. The top board 14 has a plurality of projection strips 15 which are vertically concentrically provided around the central hole 13 formed at the center thereof. The adjacent projection strips 15 form a plurality (5 in this embodiment) of concentrical second cable receiving grooves 16. The second cable receiving grooves 16 and the first cable receiving grooves 11 are opposite to each other, with the spacer 3 described below therebetween. A cable lead through hole 17 is also formed at the upper portion of each of the second cable receiving grooves 16.

The spacer 3 is made of a material such as a synthetic resin molded product or the like having excellent lubricating properties. The spacer 3 has a disc-like shape having a plurality (5 in this embodiment) of openings 18 which are provided in a portion thereof. The spacer 3 is rotatably held between the first cable receiving grooves 11 of the lower case 1 and the second cable receiving grooves 16 of the upper case 2. The openings 18 respectively cause the first and second cable receiving grooves 11, 16 to communicate with each other. A roller 20 is disposed in each of the openings 18, the rollers 20 being rotatably supported by a common pin 19. As shown in FIG. 5, the diameter of each of the rollers 20 is set to a value significantly greater than the thickness of the spacer 3. Each of the rollers 20 also has a through hole 21 which is formed at a position deviating from the center thereof and which allows the pin 19 to be passed therethrough.

Flexible cables 4, 5 each comprise a material called "a wire harness" which is formed by covering a conductor with an insulator, this embodiment using five wire harnesses. The flexible cables include two first flexible cables 4 and three second flexible cables 5, both of which are wound in opposite directions. The first flexible cables 4 are respectively wound counterclockwise in the first cable receiving grooves 11 of the lower case 1, ends of the first cables 4 being respectively folded by the rollers 20 to form substantially half loops in the openings 18, and the other ends being respectively wound clockwise along the opposite second cable receiving grooves 16 of the upper case 2. The second flexible cables 5 are respectively wound clockwise in the first cable receiving grooves 11, ends of the cables 5 being respectively folded by the rollers 20 to form substantially half loops in the openings 18, and the other ends being respectively wound counterclockwise along the second cable receiving grooves 16. Ends of the flexible cables 4, 5 are respectively passed through the cable lead through holes (not shown) and let out to the outside of the lower case 1. In the outside of the lower case 1, the flexible cables 4, 5 are bent into a crank-like shape and fixed in a holder provided on the lower side of the bottom plate 7 of the lower case 1, bundled and connected to a lower connector (not shown). The other ends of the flexible cables 4, 5 are respectively passed through the cable lead-though holes 17 and let out to the outside of the upper case 2. In the outside of the upper case 2, the flexible cables 4, 5 are bent into a crank-like shape and fixed in a holder provided on the upper side of the top board 14 of the upper case 2, bundled and connected to an upper connector (not shown).

A description will now be given of the operation of the clock spring in accordance with this embodiment in a case as an example where the lower case 1 and the upper case 2 are used as a stationary member and a movable member, respectively, mainly with reference to FIGS. 6 and 7. In the drawings, one each of the flexible cables 4, 5 is schematically shown, without showing the lower case 1 and the upper case 2.

FIG. 6 shows the state wherein almost all of the first flexible cables 4 are wound in the first cable receiving grooves 11 of the lower case 1, and almost all the second flexible cables 5 are wound in the second cable receiving grooves 16 of the upper case 2. In this case, the rollers 20 which respectively contact with the first flexible cables 4 are pressed by the first flexible cables 4 wound in the first cable receiving grooves 11 so as to upwardly project from the spacer 3. Conversely, the rollers 20 which respectively contact with the second flexible cables 5 are pressed by the second flexible cables 5 wound in the second cable receiving grooves 16 so as to downwardly project from the spacer 3.

For example, when the upper case 2 is rotated through a predetermined angle in the counterclockwise direction (direction of arrow A) from the state shown in FIG. 6, the folded portions 4', 5' of the first and second flexible cables 4, 5 are moved in the arrow A direction for a length which corresponds to half the rotational angle of the upper case 2. As a result, the first flexible cables 4 having a length corresponding to the movement length are let out of the lower case 1 toward the second cable receiving grooves 16 of the upper case 2. At the same time, the second flexible cables 5 having the same length are let out of the upper case 2 toward the first cable receiving grooves 11 of the lower case 1. In this case, since the rollers 20 are pulled by the folded portions 4' of the first flexible cables 4 so as to be rotated in the direction of arrow A through an angle of half the rotational angle of the upper case 2, the openings 18 are rotated following the folded portions 4', 5' of the flexible cables 4, 5. The rollers 20 are also rotated around the pin 19 in the clockwise direction (the direction of arrow A) according to the winding states of the first and second flexible cables 4, 5. Namely, since the winding amount of the first flexible cables 4 is small in the first cable receiving grooves 11 and large in the second cable receiving grooves 16, the upper roller 20 shown in FIG. 6 is pressed by the first flexible cable 4 in the second cable receiving groove 16 so as to be increasingly downwardly projected from the spacer 3. Conversely, the lower roller 20 shown in the drawing is pressed by the flexible cable 5 wound in the first cable receiving groove 11 so as to increasingly upwardly projected from the spacer 3.

Therefore, when the upper case 2 is rotated N times in the direction of arrow A, as shown in FIG. 7, the folded portions 4', 5' and the spacer 3 are rotated N/2 times in the direction of arrow A. The second flexible cables 5 having a length corresponding to N/2 turns of the upper case 2 are respectively wound in the first cable receiving grooves 11 from the second cable receiving grooves 16 through the openings 18. At the same time, the first flexible cables 4 having a length corresponding to N/2 turns are respectively wound in the second cable receiving grooves 16 from the first cable receiving grooves 11 through the openings 18. As a result, contrary to the state shown in FIG. 6, the rollers for the first flexible cables 4 are downwardly projected from the spacer 3, while the rollers for the second flexible cables 5 are upwardly projected from the spacer 3.

The upper case 2 can be further rotated in the arrow A direction until the second flexible cables 5 wound in the second cable receiving grooves 16 of the upper case 2 are completely wound in the first cable receiving grooves 11 of the lower case 1, i.e., the upper case 2 can be rotated a number of times which is twice the winding number of times of the flexible cables 5. In this state, the flexible cables 4 wound in the first cable receiving grooves 16.

Reversely, in the state wherein almost all the first flexible cables 4 are wound in the second cable receiving grooves 16 of the upper case 2, and almost all the second flexible cables 5 are wound in the first cable receiving grooves 11 of the lower case 1, when the upper case 2 is rotated in the clockwise direction (the direction of arrow B), since the rollers 20 are pulled by the folded portions 5' of the second flexible cables 5 so that the spacer 3 is rotated in the direction of arrow B, the folded portions 4', 5' of the first and second flexible cables 4, 5 and the spacer 3 are rotated for an angle of half the rotational angle of the upper case 2 in the direction of arrow B. The second flexible cables 5 having a length corresponding to the rotational angle of the spacer 3 are passed through the openings 18 from the first cable receiving grooves 11 of the lower case 1 and wound in the second cable receiving grooves 16 of the upper case 2. At the same time, the first flexible cables 4 having the same length are respectively passed through the openings 18 from the second cable receiving grooves 16 and wound in the first cable receiving grooves 11. In this case, the rollers 20 are pressed by the first and second flexible cables 4, 5 so as to be rotated in the clockwise direction which is reverse to the above direction.

In this way, since the above embodiment may be provided with the first and second flexible cables 4, 5 each having a length which corresponds substantially half the necessary rotational angle, the lengths of the flexible cables 4, 5 can be extremely reduced, as compared with conventional clock springs. In addition, since a wire harness can be used as each of the flexible cables 4, 5, the total cost of a clock spring can be significantly reduced. The use of the short flexible cables 4, 5 causes a reduction in the diameter of a cable receiving portion and is thus useful for reducing the size of a clock spring.

Further, since the concentric first cable receiving grooves 11 and second cable receiving grooves 16 are formed at equal groove pitches in the opposite surfaces of the lower case 1 and the upper case 2, respectively, with the spacer 3 interposed between the cable receiving grooves 11 and 16, it is possible to prevent not only the flexible cables 5 from entangling with each other but also one of the flexible cables 4 or 5 from entangling between the first cable receiving grooves 1 and the second cable receiving grooves 16. Thus the flexible cables 4, 5 can be smoothly wound and unwound.

Since the first and second flexible cables 4, 5 are wound in the opposite directions so that the spacer 3 is rotated by the flexible cables 4 or 5 when the upper case 2 is rotated, the driving mechanism of the spacer 3 is significantly simplified.

Since the rollers each having a diameter greater than the thickness of the spacer 3 are eccentrically rotatably supported in the openings 18, and the first and second flexible cables 4, 5 are respectively wound on the rollers 20 to form a half loop, the relative positions of the spacer 3 and the rollers 20 can be changed corresponding to the winding states of the first and second flexible cables 4, 5. It is therefore possible to dispose as large rollers 20 as possible in the space formed between the lower case 1 and the upper case 2. From this point, the embodiment is not only useful for reducing the size (thickness) of a clock spring but also ensures the prevention of buckling of the flexible cables 4, 5.

Figure 8:
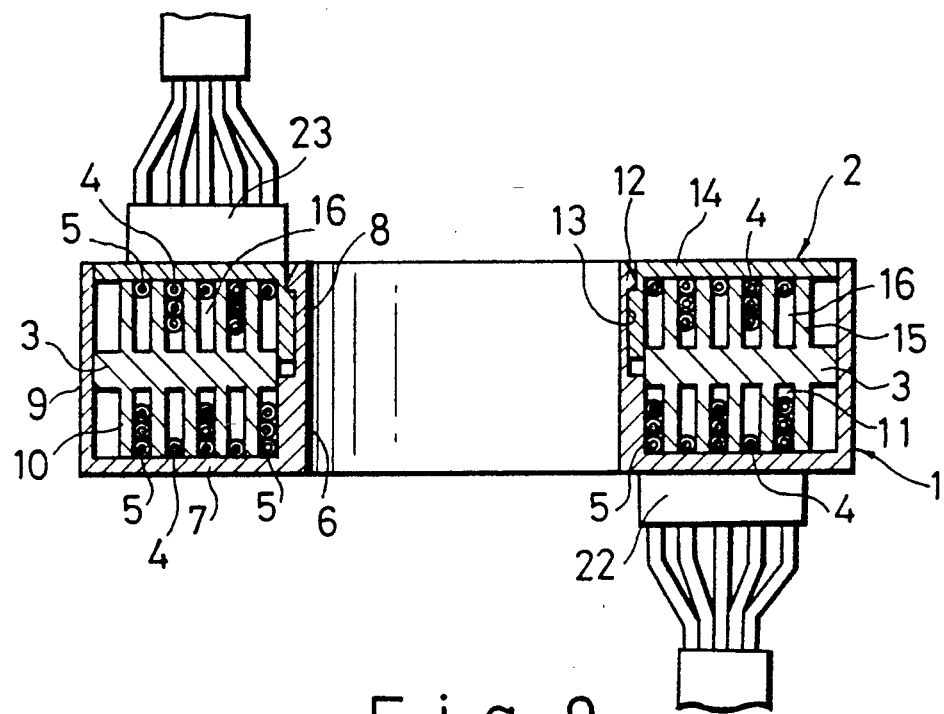
Figure 9:
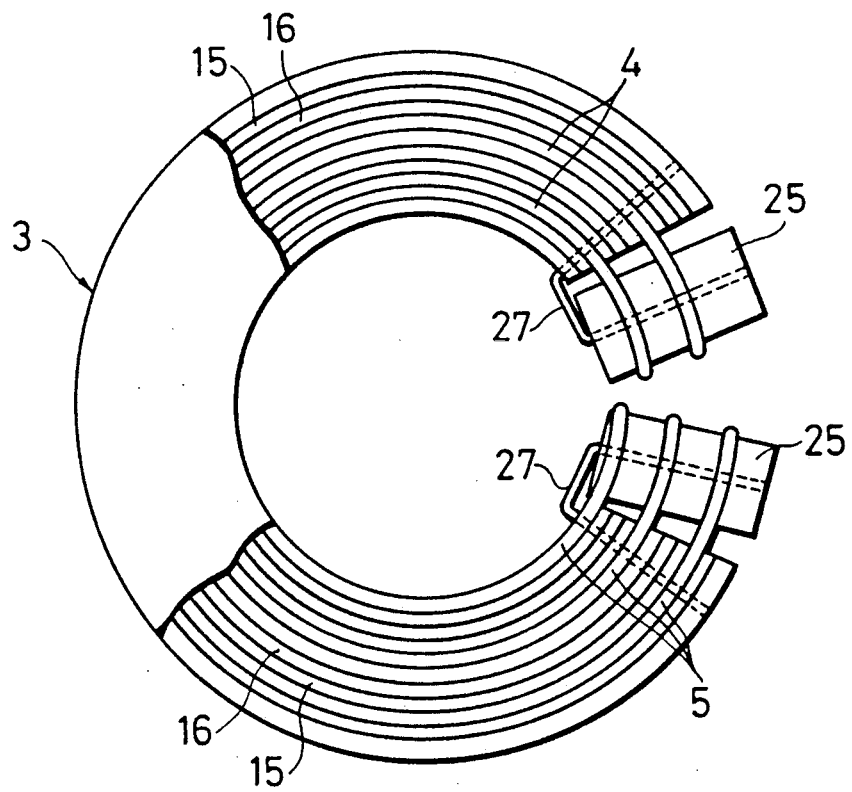
Figure 10:
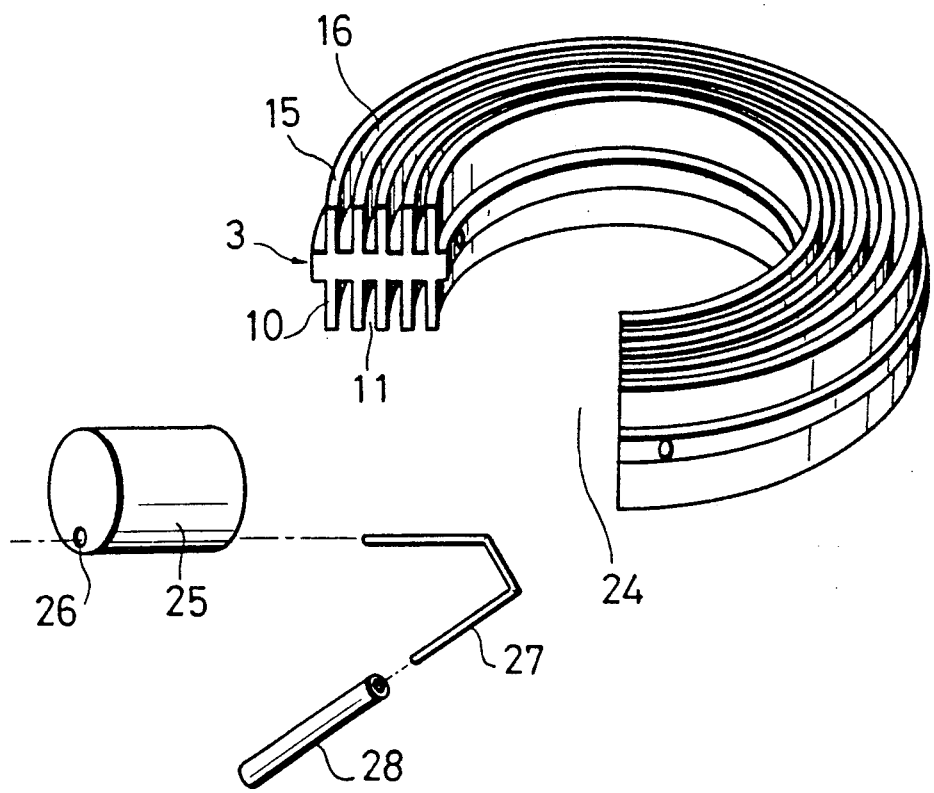
Figure 11:
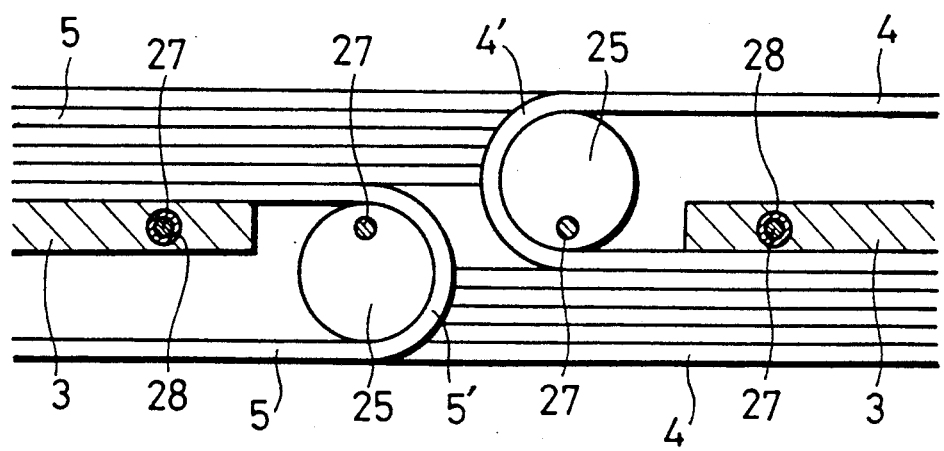

FIGS. 8 to 11 relate to a second embodiment of the present invention in which FIG. 8 is a longitudinal sectional view of a clock spring, FIG. 9 is an explanatory view showing the winding state of flexible cables, FIG. 10 is an exploded perspective view of a spacer and rollers, FIG. 11 an explanatory view of the operation of the flexible cables. The portions corresponding to those shown in FIGS. 1 to 7 are denoted by the same reference numerals.

This embodiment is different from the above-described first embodiment in the points that projection strips 10, 15 are integrally formed on the upper and lower sides of the spacer 3, and that two cylindrical rollers 25 are disposed in relatively large openings 24 which are formed by notching a part of the spacer 3. The other arrangement is basically the same as that of the first embodiment. Each of the rollers 25 has a through hole 26 which is formed at a position deviating from the center thereof. One of the two arms of a shaft body 27 is inserted into each of the through holes 26, the other arm of the shaft body 27 being held by the spacer 3 through a cylindrical collar 28. The first flexible cables 4 are folded to form half loops along the one of the rollers 25, the second flexible cables 5 are folded along the other rollers 25 to form half loops.

In the second embodiment configured as described above, the two rollers 25 are respectively rotated around the shaft bodies 27 corresponding to the winding states of the flexible cables 4, 5 so that the rollers 25 are variably projected from the both sides of the spacer 3. This embodiment thus has the same effect as that of the first embodiment.

Although the above embodiments concern a case where the lower case 1 and the upper case 2 are used as a stationary member and a movable member, respectively, reversely, the upper case 2 and the lower case 1 may be used as a stationary member and a movable member, respectively.

Although the above embodiments concern a case where a plurality of wire harnesses are used as the first and second flexible cables 4, 5, bare conductive wires without any insulator cover or coated flat conductive wires can be used in place of wire harnesses.

In addition, although the above embodiments concern a case where the spacer 3 is rotated by the first and second flexible cables 4, 5 which are wound in the opposite directions, the mechanism for driving the spacer is not limited to this, and the spacer can be driven by using power transmitting means such as rollers, gears or the like. In this case, the flexible cables 4, 5 are wound in the same direction.

As described above, the present invention enables a significant reduction in the length of each of the cables used, and rollers to be effectively disposed in a limited space between a movable member and a stationary member for the purpose of preventing the buckling of the folded portions of the cables. The invention therefore can provide an inexpensive clock spring suitable for reducing the size thereof.

What is claimed is:

1. A clock spring comprising:

a stationary member defining a first cable receiving portion;

a moveable member rotatably coupled to said stationary member, said moveable member defining a second cable receiving portion;

a first plurality of cables having one end coupled to said stationary member and another end coupled to said moveable member, portions of said first plurality of cables wound in a first direction in said first cable receiving portion, and other portions of said first plurality of cables wound in a second direction in said second cable receiving portion;

a second plurality of cables having one end coupled to said stationary member and another end coupled to said moveable member, portions of said second plurality of cables wound in said second direction in said first cable receiving portion, and other portions of said second plurality of cables wound in said first direction in said second cable receiving portions;

a spacer rotatably disposed between said moveable member and said stationary member, said spacer including a plurality of radially disposed openings, said spacer having a predetermined thickness; and a plurality of rollers, each said roller disposed in an associated one of said plurality of openings, said rollers eccentrically mounted on a common axis, said rollers having a diameter greater than said predetermined thickness, said first plurality of cables being trained over a first group of said rollers and through said associated openings, said second plurality of cables being trained over a second group of said rollers and through said associated openings.

2. A clock spring of claim 1 wherein said common axis is a pin disposed on said spacer, said first group and said second group of said rollers being rotatably coupled to said pin.

* * * * *